United States Patent [19]
Yoshida et al.

[11] Patent Number: 5,536,002
[45] Date of Patent: Jul. 16, 1996

[54] FINANCIAL INSTITUTION SYSTEM, METHOD OF CONTROLLING FINANCIAL INSTITUTION SYSTEM AND APPARATUS FOR CONVEYING VALUABLE PAPER SHEETS

[75] Inventors: Kazushi Yoshida, Ibaraki-ken; Masataka Kawauchi, Ishioka, both of Japan

[73] Assignee: Hitachi, Ltd., Tokyo, Japan

[21] Appl. No.: 251,672

[22] Filed: May 31, 1994

Related U.S. Application Data

[60] Continuation of Ser. No. 977,257, Nov. 16, 1992, abandoned, which is a division of Ser. No. 610,145, Nov. 7, 1990, Pat. No. 5,167,300.

[30] Foreign Application Priority Data

Nov. 10, 1989 [JP] Japan ................................. 1-291276

[51] Int. Cl.$^6$ .................................................. B65H 5/00
[52] U.S. Cl. ........................... 271/264; 271/272; 271/303; 198/583
[58] Field of Search ................................. 271/264, 272, 271/303; 198/583

[56] References Cited

U.S. PATENT DOCUMENTS

| | | | |
|---|---|---|---|
| 3,881,594 | 5/1975 | Jepsen | 198/583 |
| 4,014,428 | 3/1977 | Ossbahr | 198/465.3 |
| 4,066,253 | 1/1978 | Lundbald et al. | 271/264 |
| 4,645,035 | 2/1987 | Bavis | 198/604 |
| 4,925,009 | 5/1990 | Hill | 198/583 |
| 5,096,045 | 3/1992 | Feldl | 198/583 |

FOREIGN PATENT DOCUMENTS

| | | | |
|---|---|---|---|
| 13998 | 2/1978 | Japan | 271/264 |
| 61-140455 | 6/1986 | Japan | 271/303 |
| 18237 | 1/1990 | Japan | 271/264 |

*Primary Examiner*—David H. Bollinger
*Attorney, Agent, or Firm*—Antonelli, Terry, Stout & Kraus

[57] ABSTRACT

A conveyor apparatus for conveying paper sheets having a plurality of conveyor path units which are connected to form a continuous conveyor path. Each unit includes a housing having both longitudinal ends opened, a sheet conveyor, provided in the housing, for conveying the paper sheets while holding the paper sheets between endless belts and a connecting structure provided on both longitudinal ends to enable each unit to be connected in series with other units. The conveyor is disposed near both longitudinal ends to make a distance between an adjacent conveyor, when the units are connected, small.

8 Claims, 5 Drawing Sheets

F I G. 5
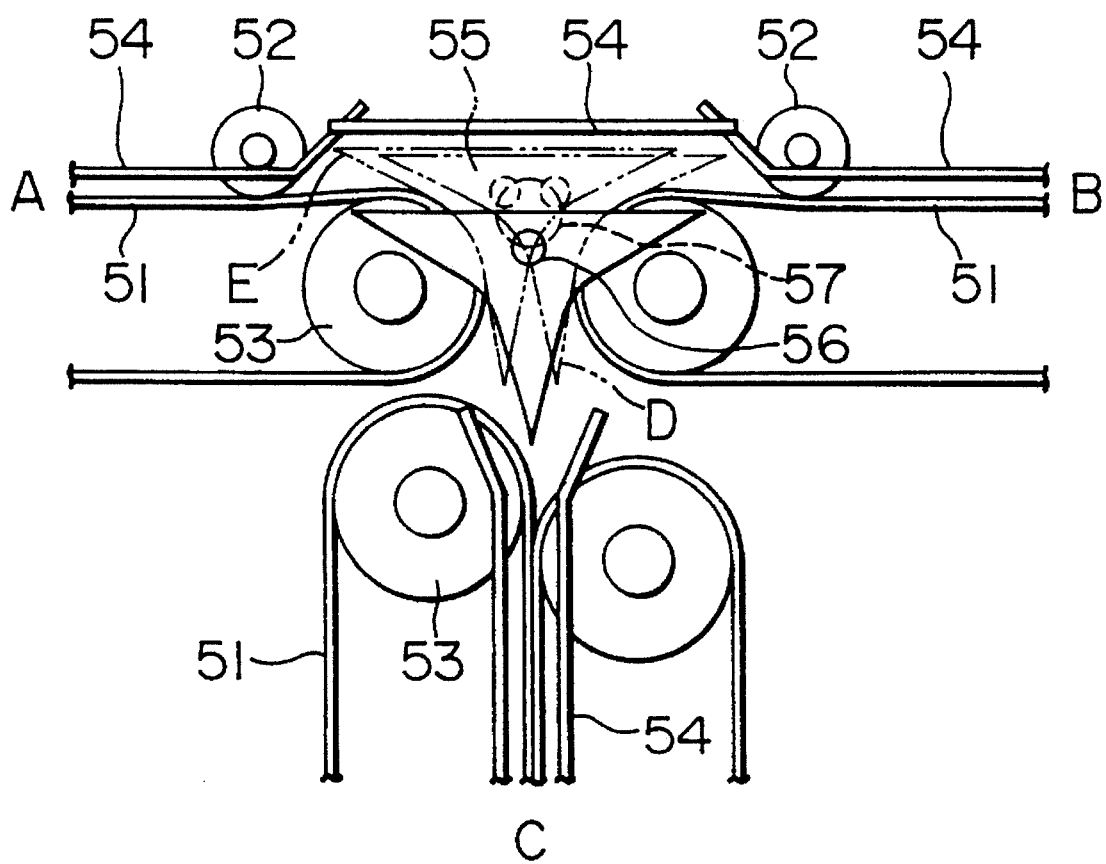

# FINANCIAL INSTITUTION SYSTEM, METHOD OF CONTROLLING FINANCIAL INSTITUTION SYSTEM AND APPARATUS FOR CONVEYING VALUABLE PAPER SHEETS

This application is a continuation of application Ser. No. 07/977,257 filed Nov. 16, 1992, now abandoned which is a division of application Ser. No. 07/610,145, filed Nov. 7, 1990 which issued as U.S. Pat. No. 5,167,300 on Dec. 1, 1992.

BACKGROUND OF THE INVENTION

1. Field of the Invention

The present invention relates to a financial institution system for shops which deal with valuable paper sheets such as bills and securities, e.g., banks, post offices stock companies and so forth and also to a method of controlling the financial institution system, as well as to an apparatus for conveying valuable paper sheets.

2. Description of the Related Arts

A financial institution system is disclosed in, for example, Japanese Patent Unexamined Publication No. 62-78694. This system has a wicket counter section for dispensing and receiving cash, and a safe section having a safe and adapted for administrating cash, cash books and securities. The cash and so forth are conveyed from the safe section to the wicket counter section and vice versa by a conveyor system. The conveyor system has conveyor paths laid under the floor so as to connect these sections. A carrier for carrying the cash or the like is adapted to run along the conveyor paths so that the cashes or the like are conveyed between the wicket counter section and the safe section.

In the conventional system, no arrangement such as T junction is adopted for conveying cash or the like to and from three paths which are connected in a T-like form. When a three-way convey of cashes or the like is necessary, a pair of gate members are provided at the junction so as to switch the direction of the convey.

The above-described system is advantageous in that the wicket counters can be freely positioned on the floor of the shop because the convey paths are hidden under the floor. This system, however, suffers from the following disadvantages which are to be overcome when the system is put into practical use.

Namely, a construction work is necessary for forming ditches or grooves under the floor at a cost of money and labor. In addition, the conveyor paths once set cannot be altered, which undesirably limits the lay-out of the wicket counters. Furthermore, quite a laborious and troublesome work is necessary for repairing the conveyor system in the event of a failure because no means is provided for dealing with such a trouble.

Furthermore, a pair of gate members are necessary for a three-way convey, increasing the number of parts and requiring complicated control, resulting in a greater tendency of troubles such as jamming.

SUMMARY OF THE INVENTION

An object of the present invention is to provide a financial institution system in which conveyor paths can be formed freely at a low cost and in which, in the event of a trouble in the system, the safe condition is recovered without difficulty and without causing any substantial influence on the cash banking terminals, thereby over-coming the above-described problems of the prior art.

Another object of the present invention is to provide an apparatus for conveying valuable paper sheets such as bills capable of conducting three-way convey of the sheets with a simple mechanism and a high degree of reliability.

According to the present invention, the conveyor path along which the valuable paper sheets are conveyed is composed of a plurality of types of units having different functions such as conveying function and direction switching function. A plurality of classes of conveying units having different lengths are used. All these units has the same connecting structures so that each unit can be connected to any of other types of units. These units are constructed so as to be easily laid and fixed on the existing floor surface by means of a stopper or the like. A new floor is laid on the conveyor paths formed from three units. The units and the new floor are so constructed that they are opened to make the interior of the conveyor path accessible in the event of a failure. At least two such conveyor paths are provided between each cash banking terminal and the central section such as a safe.

To realize a simple and reliable three-way convey of the valuable sheets such as cash bills, a direction switching apparatus has a switching gate member carried by a gate holding member. The gate holding member moves along a circle so as to cause an eccentric motion of the gate member in conformity with the geometry of the T junction so as to direct and receive cash bills to and from one of the three paths.

In the financial institution system of the present invention, the conveyor paths can be constructed by connecting a plurality of types of units, so that the arrangement of the conveyor paths can be designed freely in accordance with the lay-out of the equipments in the shop determined by the user. In addition, no substantial construction work is necessary because the conveyor paths are formed on existing floor or walls. Furthermore, any alteration of the arrangement of the conveyor paths can be conducted in a short time and at a low cost. Repair and recovery works such as removal of jamming sheets also can be conducted quickly and easily because the conveyor path units and the new floor on the units are openable. The dual arrangement of the conveyor paths between the cash banking terminal and the central section such as a safe ensures that the valuable paper sheets such as cash bill can be safely conveyed without causing suspension of transactions even when a trouble has occurred in one of these two paths. Thus, the transactions can be continued safely even when the person in charge of the repair is absent.

In the conveyor apparatus of the present invention member makes an eccentric rotation so as to serve as a guide conforming with the configuration of the junction of the conveyor path, thereby directing and receiving the valuable paper sheets to and from any of the three directions.

BRIEF DESCRIPTION OF THE DRAWINGS

FIG. 5 is a schematic illustration of a critical portion of an embodiment of the conveyor apparatus in accordance with the present invention.

DESCRIPTION OF THE PREFERRED EMBODIMENTS

Figure 1:
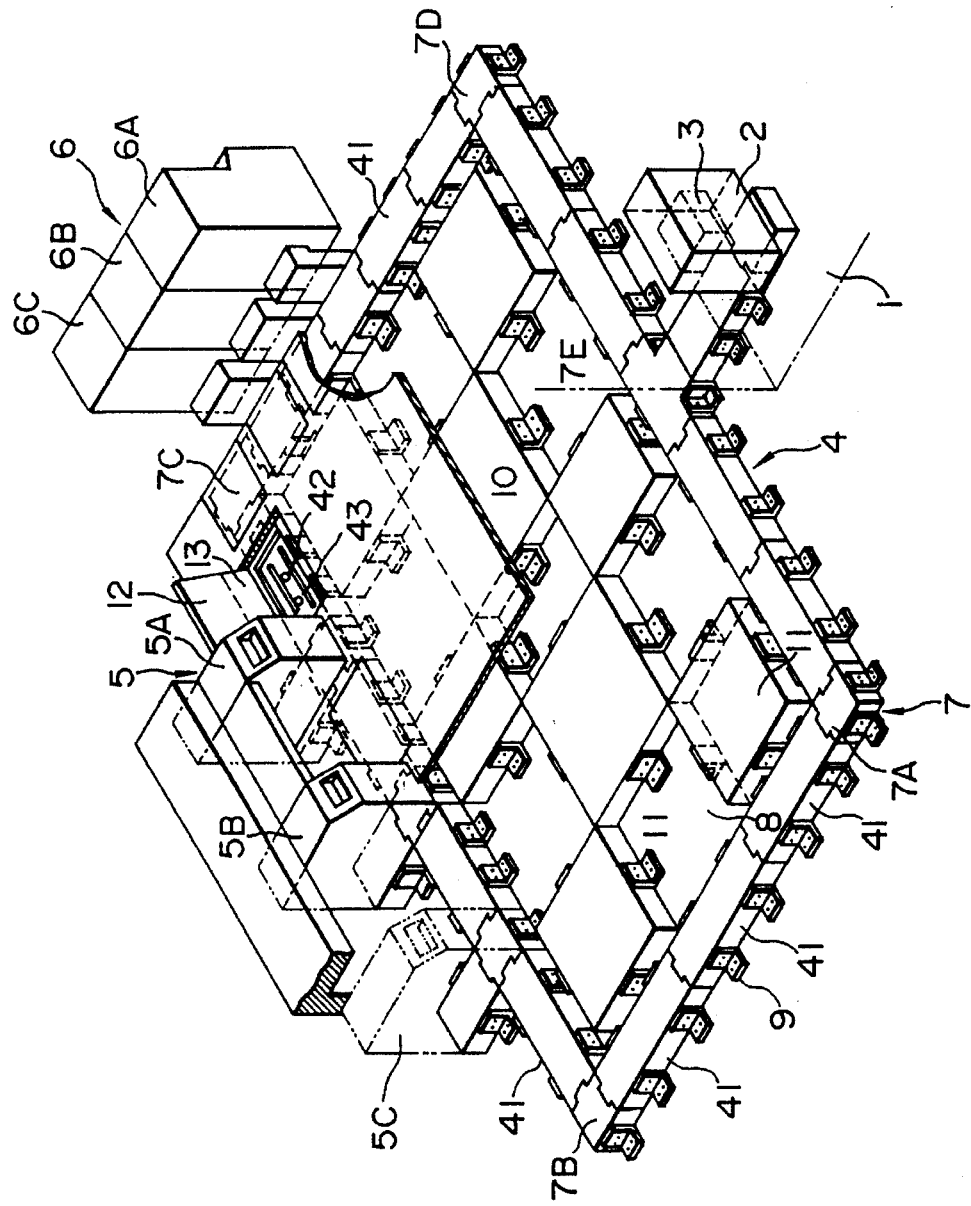
FIG. 1 is a schematic perspective view of an embodiment of a financial institution system of the present invention.

Embodiment of the present invention will be described with reference to FIGS. 1 to 5. FIG. 1 shows a financial institution system such as a bank system embodying the present invention. The system has a source or central section (intensive dealing section) 1, a delivery/receipt unit 2 in the central section adapted for conducting delivery and receipt of cash bills between a conveyor path 4 and the central section 1, a discrimination device 3 in the central section adapted for discriminating the type of the cash bills and for judging whether the cash bills are not counterfeit and whether the cash bills are safe or broken, banking terminals 5 for band clerk (three banking terminals 5A, 5B, 5C are used), cash banking terminals 6 such as ATM (Automated Tellers Machines) for customers (three cash banking terminals 6A, 6B, 6C are used), conveyor paths 4 which connect the central section 1 to the banking terminals 5 and cash banking terminals 6, conveying direction switching devices 7 for switching the direction of convey of the cash bills, sensors (not shown) disposed in the conveyor paths and capable of counting the number of the cash bills passing through the conveyor paths 4, and a controller (not shown) for controlling the conveyor to direct the cash bills to the desired destination.

Each conveyor path 4 is composed of a plurality of units 41. Each direction switching device 7 also forms a unit. Different types of such units 7A, 7B, 7C, 7D and 7E are used.

Figure 2:
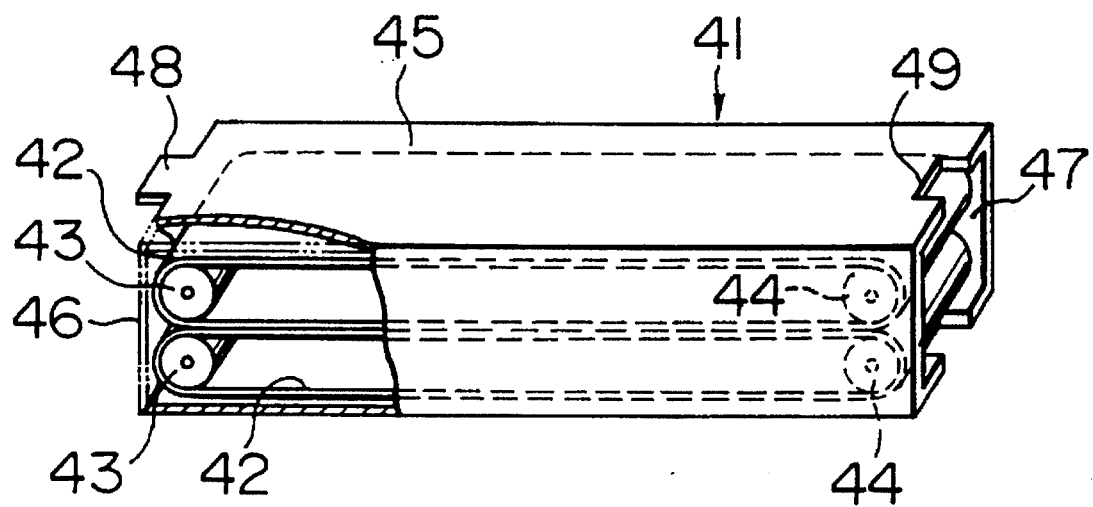
FIG. 2 is a partly cut-away perspective view of a conveyor path unit used in the system of the present invention.

FIG. 2 is a schematic illustration of the unit 41 as a component of the conveyor path 4. The unit 41 has an elongated parallelepiped frame 45 which is opened at its both longitudinal ends 46, 47. A pair of flat belts 42, 42 are disposed in the frame 45. Each belt is wound around a drive pulley 43 and an idle pulley 44 so that each belt 42 is driven independently by the associated drive pulley 43. These belts are arranged to oppose each other so as to clamp and convey cash bills therebetween. The drive pulley 43, 43 are connected to a driving power source (not shown) which is adapted to control the drive pulleys of all units in synchronization. Connecting structures 48 and 49 are provided on the open ends 46, 47 of the frame 45 so that the units can be integrally connected to outer units. The pair of flat belts in the unit 41 may be substituted by other suitable means such as a belt roller unit.

Conveyor paths are formed between the terminal 5, 6 and the central section 1, by connecting a plurality of units 41 in accordance with the lay-out of these terminals 5, 6. Each unit 41 can be fixed to existing floor 8 of the building by means of a stopper 9. After the conveyor paths are laid, a second floor (new floor) 10 is laid on these conveyor paths. Spacers 11 of the same height as the unit 41 are placed on the floor 8 in the area where no conveyor path 4 is laid, so as to support the new floor 10. The new floor 10 is openable as denoted by 10A. The conveyor unit 41 also is openable at its portion 41 facing the new floor 10 so as to enable a prompt recovery such as removal of jamming sheets in the event of a failure. In this embodiment, a pair of conveyor paths each having the described construction are provided between each banking terminal 5A, 5B, 5C and the central section 1. For instance, the banking terminal 5A is connected to the central section 1 through two routes: that is, a first route formed by the unit 7E, unit 7A and unit 7B, and a second route formed by the unit 7E, unit 7D and unit 7C. For example, when a jam has occurred in the first route at a portion between the units 7A and 7B, the passage of the cash bills is switched to the second route so that the banking terminal 5A can operate without suspension. In addition, no influence is caused on other terminals 5B, 5C and 6A, 6B, 6C. After the removal of the jamming sheet, the passage is switched to the first route which is the normal route.

Figure 3:
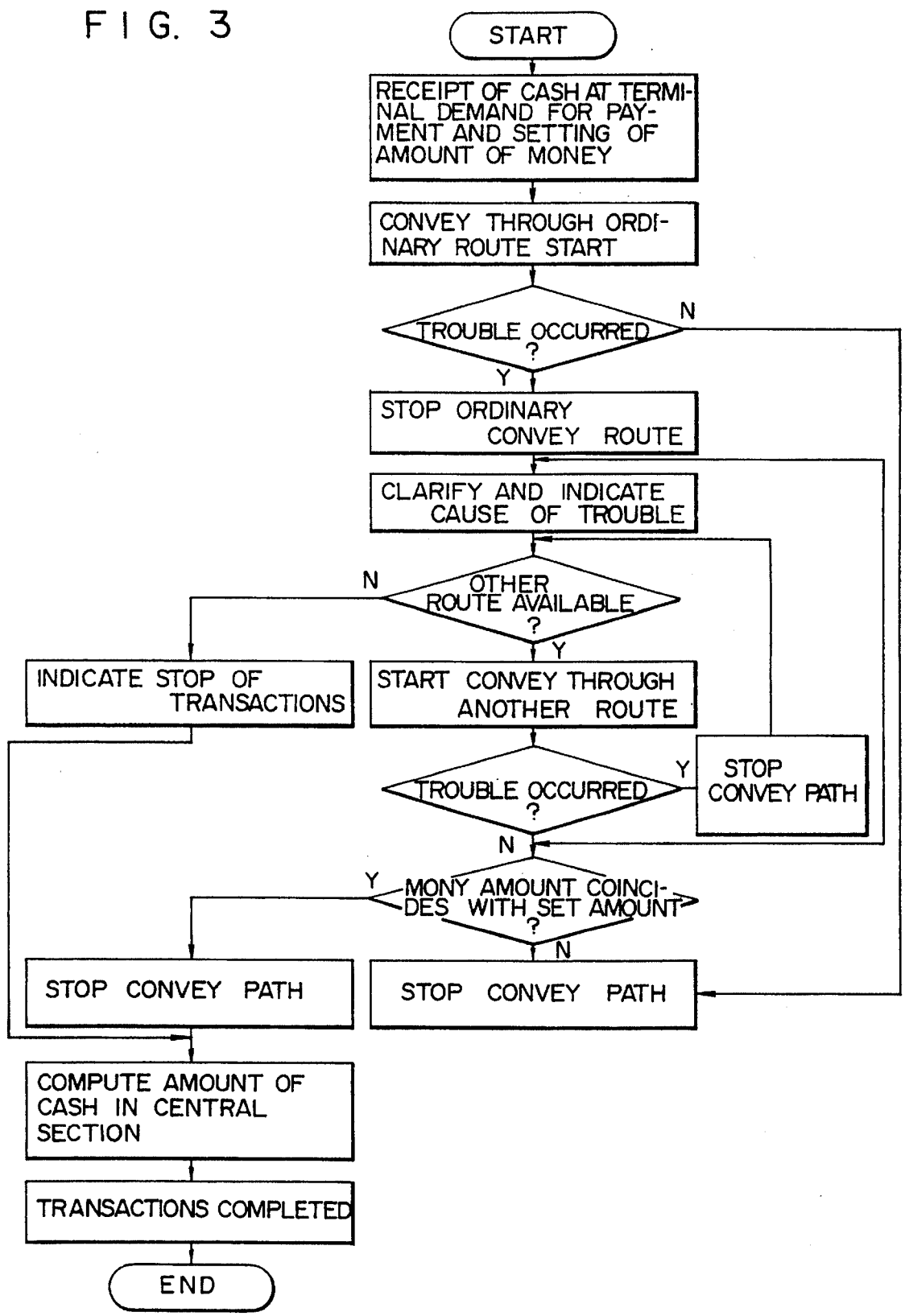
FIG. 3 is a flowchart showing a method of the invention for controlling the financial institution system.

FIG. 3 shows an example of the algorithm. When a demand for receipt or payment is received, the cash bills are conveyed through the normal route, e.g., the first route. After a safe convey of the cash bills, the sum of the money is counted and a computation or a calculation is conducted in the central processing section 1, and the transactions are completed if the results of the computation is correct. When the computation result is incorrect, the first route is made inoperative and the convey is conducted again through the second route. That is, when any trouble such as a jam has occurred in the instant route during the convey of the designated amount of money, the control unit stops the operation of this route and indicate the cause and position of the trouble to enable a quick recovery by the person in charge. At the same time, the control unit seeks for any route available for the convey of the cash bills. If no route is available, the transactions of the cash banking terminal 5 is stopped to wait for the recovery. If another route is available, the demanded amount of cash bills is conveyed through this route. In this embodiment, a shortage of money occurs due to bills remaining in the route in which the trouble has taken place. However, this shortage is recognized by the central processing section 1 and the bills taken out from the route during the repair is added to the result of the computation so that the money can be administrated in proper quantities. When the cash bills have been conveyed safely through the other route, confirmation and computation are executed as described before and the transactions are completed when the results are correct.

Figure 4:
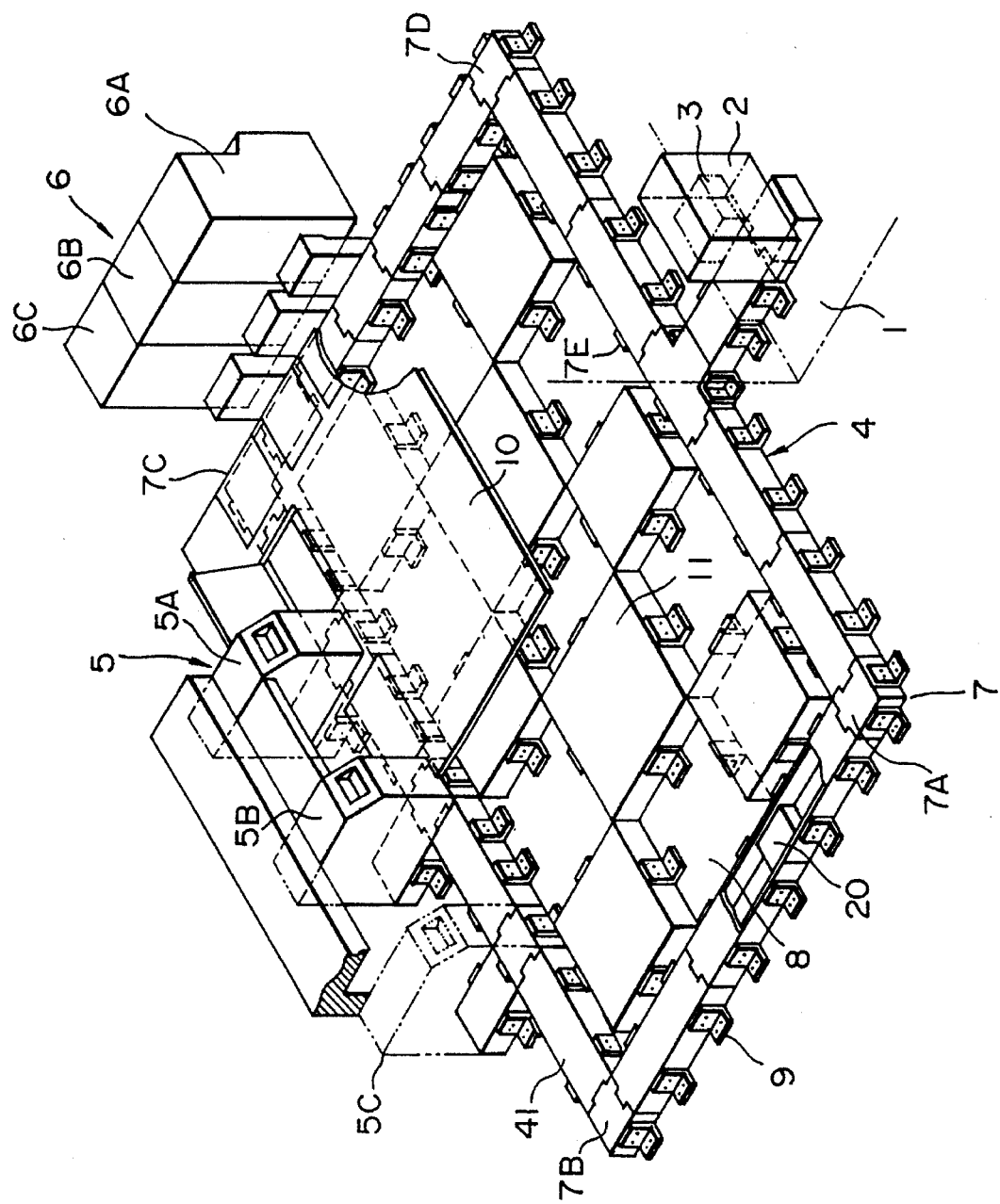
FIG. 4 is a schematic perspective view of another embodiment of the financial institution system of the present invention having a movable supplementation package; and`

In the embodiment shown in FIG. 1, the cash bills are conveyed as independent sheets through the successive conveyor units. This, however, is not exclusive and the cash bills also may be conveyed in batches by means of a movable supplementation package 20 as shown in FIG. 4. The breadth and length of the supplementation package are determined to be smaller than the width of the conveyor path so that the package 20 can smoothly turn at corners of the paths.

FIG. 5 shows an example of a three-way direction switching unit 7E which is used as one of the convey direction switching devices 7 in the embodiments shown in FIGS. 1 and 4. This direction switching device 7 (7E) has the following components: conveyor belts 51 for conveying cash bills, driven rollers 52, pulleys 53 around which the belts are wound, sheet guides 54 for guiding the cash bills which are being conveyed, a gate member 55 which switches the direction of the convey, a gate holding member 56 for holding the gate member 55 in the direction switching region, and an actuator (not shown) for actuating the gate member 55. When the gate member 55 is in the position illustrated by solid lines in FIG. 5, the cash bills are allowed to move from an end A to an end B or vice versa. For enabling the cash bills to move from the ends A to an end C or vice versa, the gate member 55 is moved to a position indicated by one-dot-and-dash line D. Convey of the cash bills from the ends B to the end C and vice versa can be conducted when the gate member 55 is set to the position shown by one-dot-and dash line E. The above-described behavior of the gate member 55 can be realized by actuating the gate holding member 56 so as to move it along a circle such that the gate member 55 makes an eccentric rotation. With this arrangement, it is possible to receive and direct the cash bills in any of the three directions by the operation of the gate member 55. Although, in this embodiment, the gate holding member 56 moves along a circle, this is only illustrative and the gate holding member can move along any other suitable path provided that the gate member 55 can make an eccentric rotation in conformity with the geometry of the junction 56.

As has been described, the present invention provides a financial institution system in which conveyor paths along which cash bills are conveyed can be designed and constructed freely at low cost in accordance with the lay-out of equipments in the shop and in which any trouble occurring in one of the conveyor paths produce minimal influence on cash banking terminals. The invention also provides a conveyor apparatus which can conduct a highly reliable three-way convey of cash bills or the like with a simple mechanism and action.

According to the invention, a financial institution system such as a bank branch system can be constructed without requiring any substantial construction work and, hence, at a low cost. In addition, in the event of a trouble such as jamming in a conveyor path, the work for recovering safe operation can be conducted easily while minimizing undesirable influences caused on the operation of the cash banking terminals. Furthermore, a simple and reliable three-way conveyor apparatus can be obtained by the use of the direction switching device of the invention.

Thus, the present invention makes it possible to design and construct a financial institution system which well meets the user's specifications and easy to operate by the user.

What is claimed is:

1. A conveyor apparatus for conveying paper sheets comprising:
  a plurality of conveyor path units which are connected to form a continuous conveyor path, each said unit includes:
    a housing having both longitudinal ends opened,
    a sheet conveying means provided in said housing, and
    connecting structure provided on both longitudinal ends so as to enable each said unit to be connected in series; and
  at least one conveying direction-switching means, disposed between two of said conveyor path units, for conducting switching between said continuous conveyor path and another continuous conveyor path, said conveying direction-switching means including a stationary main part, a switching gate member, and a gate holding member holding said switching gate member, wherein said gate holding member moves along a trajectory to move said switching gate member to cause switching between said continuous conveyor path and said another continuous conveyor path.

2. A conveyor apparatus according to claim 1, wherein said conveying means includes a combination of a conveyor belt and rollers.

3. A conveyor apparatus according to claim 1, wherein said trajectory is a circle.

4. A conveyor apparatus according to claim 3, wherein said conveying means includes a combination of a conveyor belt and rollers.

5. A conveyor apparatus for conveying paper sheets comprising:
  a plurality of conveyor path units which are connected to form a continuous conveyor path, each said unit includes:
    a housing having both longitudinal ends opened,
    a sheet conveying means provided in said housing, and
    connecting structure provided on both longitudinal ends so as to enable each said unit to be connected in series; and
  at least one conveying direction-switching means, disposed between two of said conveyor path units, for conducting switching between said continuous conveyor path and another continuous conveyor path, said conveying direction-switching means including a stationary main part, a switching gate member, and a gate holding member holding said switching gate member so as to move along a circle,
  wherein said sheet conveying means includes means for moving packages containing said paper sheets, said means for moving packages including guide members for guiding said packages.

6. A conveyor apparatus for conveying paper sheets having a plurality of conveyor path units which are connected to form a continuous conveyor path, each unit comprising:
  a housing having both longitudinal ends opened and connectors provided on sides of said housing for attachment of stoppers used to fix said unit to a floor;
  a sheet conveying means provided in said housing; and
  a connecting structure provided on both longitudinal ends to enable each unit to be connected in series with other units, wherein each unit is fixed to said floor by attaching said stoppers to said connectors and fixing said stoppers to said floor.

7. A conveyor apparatus according to claim 6, wherein an upper portion of the housing of said unit is openable to permit a jammed sheet to be removed by opening said upper portion.

8. A conveyor apparatus for conveying paper sheets comprising:
  a plurality of conveyor paths forming a plurality of conveying routes; and
  conveying direction-switching means for conducting switching between said routes, said conveying direction-switching means including a stationary main part, a switching gate member, a gate holding member holding said switching gate member, and means for moving said gate holding means along a trajectory member, wherein said moving means moves said gate holding member along said trajectory member to move said switching gate member to cause switching between said routes;
  wherein said trajectory member is formed in a circle.

* * * * *